United States Patent [19]
Gelardi et al.

[11] Patent Number: 4,793,480
[45] Date of Patent: Dec. 27, 1988

[54] STORAGE CONTAINER FOR A RECORDING MEDIUM WITH A PIVOTALLY MOUNTED TONGUE

[75] Inventors: Anthony L. Gelardi; John Gelardi, both of Cape Porpoise; Richard Rolfe, Biddeford, all of Me.; Alan B. Lowry, Canton, Mass.; Craig Lovecky, Old Orchard Beach, Me.

[73] Assignee: Shape Inc., Biddeford, Me.

[21] Appl. No.: 942,266

[22] Filed: Dec. 16, 1986

[51] Int. Cl.$^4$ .............................................. B65D 85/57
[52] U.S. Cl. ...................................... 206/312; 206/444; 220/339; 312/10; 360/133; 360/99.06; 369/291; 493/946
[58] Field of Search ............... 206/309, 307, 311, 310, 206/312, 313, 387, 444, 45.18, 45.14–45.16, 45.13; 220/339; 312/10–14; 360/133, 97–99; 369/291; 493/946

[56] References Cited

U.S. PATENT DOCUMENTS

| | | | |
|---|---|---|---|
| D. 283,948 | 5/1986 | Clouser et al. | D3/35 |
| D. 283,949 | 5/1986 | Kitada | D3/35 |
| 2,600,023 | 6/1952 | Rice | 206/310 |
| 3,836,222 | 9/1974 | Kuntze | 206/45.13 X |
| 3,987,900 | 10/1976 | Tadokoro et al. | 206/313 |
| 4,084,200 | 4/1978 | Adair et al. | 360/133 |
| 4,225,038 | 9/1980 | Egly | 206/45.18 |
| 4,289,235 | 9/1981 | Egly | 206/387 |
| 4,327,831 | 5/1982 | Inaba et al. | 206/310 |
| 4,356,918 | 11/1982 | Kaele et al. | 206/444 |
| 4,369,879 | 1/1983 | Egly et al. | 206/45.18 |
| 4,449,628 | 5/1984 | Egly et al. | 206/45.18 |
| 4,478,335 | 10/1984 | Long et al. | 206/444 |
| 4,496,050 | 1/1985 | Kirchner et al. | 206/444 |
| 4,497,009 | 1/1985 | Oisli et al. | 360/133 |
| 4,498,583 | 2/1985 | Long et al. | 206/444 |
| 4,508,217 | 4/1985 | Long et al. | 206/45.18 |
| 4,511,034 | 4/1985 | Pan | 206/310 |
| 4,520,470 | 5/1985 | d'Alayer | 206/310 X |
| 4,523,246 | 6/1985 | Okuzawa | 360/133 |
| 4,535,888 | 8/1985 | Nusselder | 206/444 |
| 4,538,730 | 9/1985 | Wu | 206/444 |
| 4,586,603 | 5/1986 | Long et al. | 206/45.18 |
| 4,655,342 | 4/1987 | Brauner et al. | 206/45.18 |
| 4,676,375 | 6/1987 | Willems et al. | 206/444 |
| 4,694,448 | 9/1987 | Tanen et al. | 369/291 |
| 4,702,369 | 10/1987 | Philosophe | 206/312 |

*Primary Examiner*—Stephen Marcus
*Assistant Examiner*—Bryon Gehman
*Attorney, Agent, or Firm*—Staas & Halsey

[57] ABSTRACT

A storage container for a recording medium and related methods of manufacturing and assembling same are described. The storage container includes: a base; a recording medium holder having a compact disc clamp and being pivotally attached at a first end thereof to a first end of the base and the other end being a free end for movement relative to the base; a cover pivotally attached at a first end thereof to the first end of the base; and an actuator for moving the holder relative to the base. When the cover is lifted relative to the base, the actuator causes the holder to move from the first position to the second position and to automatically present the recording medium away from the base for facilitated removal and replacement. In one embodiment, the clamp can include two portions, one of which is a semicircular portion formed on the holder and the other of which is a raised semicircular portion formed on a tongue pivotally attached to the holder. The tongue is movable relative to the holder such that the raised portion is capable of engaging the compact disc aperture for storage or releasing the aperture for removal of the disc. The methods include at least the steps of: forming a base; forming and pivotally attaching a recording medium holder at a first end thereof to a first end of the base and having its other end free for movement relative to the base; forming and pivotally attaching a cover at a first end thereof to the first end of the base; and forming an actuator to move the holder from the first position to the second position when the cover is raised.

17 Claims, 9 Drawing Sheets

STORAGE CONTAINER FOR A RECORDING MEDIUM WITH A PIVOTALLY MOUNTED TONGUE

BACKGROUND OF THE INVENTION

This invention relates to a container for a recording medium and, more particularly, to an easier to use storage container for a compact, digital, audio disc and related methods for manufacturing and assembling same.

Containers are currently available for storing recording media, such as compact, digital audio discs. For example, currently the most successful storage container for a compact disc includes a rectangular base, a corresponding rectangular cover pivotally connected to the base, and a rectangular disc holder fixedly connected to the base. The rectangular holder includes a circular recess for receiving the disc and a central, circularly shaped, radially ribbed, clamp which receives the center hole of the compact disc via an interference fit to hold the disc in the container. In addition, a small rib or projection is usually formed on the side walls of the cover to effect an interference fit with the side walls of the base to keep the container normally closed. To release the disc, one must pry open the cover, push down on the clamp with the index finger and simultaneously fit one's thumb and middle finger on opposite sides of the disc between the holder and the disc and pull up.

The several following disadvantages associated with this conventional container are well known.

First, the disc is difficult to remove and reattach, thus presenting a nuisance to the user and sometimes even causing breakage of the container, particularly where the cover is pivotally attached to the base. The breakage is partly due to the fact that these containers have been made of plastics with no impact resistance.

Second, the closing rib or projection quickly breaks or wears away, causing the container to undesirably open.

Third, the conventional storage container is relatively difficult to manufacture and assemble by automation due particularly to the difficulty in mating the pivot points between the cover and the base. In addition, automation has been particularly frustrated due to the difficulty in efficiently inserting an advertising card or information insert between the holder and base.

Efforts have been made to facilitate removal of a recording medium such as spacing the recording medium from the base storage container when opened. For example, in the floppy disc art, the following patents disclose means for storing and presenting one or more floppy discs away from a base.

U.S. Pat. No. 4,496,050, issued to KIRCHNER et al., discloses a case for holding floppy discs having a cover hinged to the body to be pivoted upwardly from the body. A separate lid is also hinged to the cover near the cover's rear edge. To ensure that opening movement of the cover also opens the lid, the lid is provided on its sides with cams or pins, which engage respective cam tracks provided in the body.

U.S. Pat. Nos. 4,498,583 and 4,478,335, issued to LONG et al., also disclose a floppy disc storage container formed of three molded plastic parts which are pivotally connected together. That is, a disc support member is pivotally mounted to the cover and includes camming surfaces which ride on the cams as the cover is rotated toward its open position. A notch in the camming surface is positioned to engage the cams when the cover is fully opened to allow the disc support member to drop forward a predetermined distance, thereby improving accessibility to the disc.

U.S. Pat. Nos. 4,369,879 and 4,449,628 issued to EGLY et al., disclose a floppy disc storage container which has a cover with a ledge for receiving a disc therein and a base. The cover is connected to the base by a resilient living hinge that allows for opening of the lid into a clam shell configuration. The lid is then supported by a stop member against one of the edge walls or by means of a channel groove in combination with a pin.

Finally, U.S. Pat. No. 4,511,034, issued to PAN discloses a storage container for a floppy disc including an elastic tongue plate connected to the lower portion of a right half of the body of the container. A semi-circular opening is centrally formed in an upper end of the tongue plate, wherein the disc is clamped between the elastic tongue plate and the right half of the body. The elastic tongue plate can move outwardly under gravity to present the disc away from the body of the container.

Although the prior art containers described above are reasonably reliable for storage purposes, they still do not teach a storage container for a recording medium, such as a compact disc, and methods for manufacturing and assembling same providing the easiest use by the consumer, the most cost and time-efficient manufacture, the most automated assembly and the greatest marketing appeal.

SUMMARY OF THE INVENTION

Accordingly, it is an object of the present invention to provide a storage container for a recording medium which is easy to use by the consumer and appealing in its operation.

It is another object of the present invention to provide a storage container for a recording medium which easily opens, automatically presents the recording medium to the user away from the storage container to facilitate removal, and can be easily closed when the recording medium is replaced.

It is another object of the present invention to provide a storage container for a recording medium which meets all industry standards, such as size, and is compatable with standard information containing inserts, but which is stronger, more appealing and receives the insert more easily.

It is another object of the present invention to provide a storage container for a recording medium including a holder for receiving the recording medium, which holder is capable of being automatically raised and lowered by the opening and closing, respectively, of the container.

It is another object of the present invention to provide an easier to manufacture storage container for a recording medium, which, with little difficulty, receives an information containing insert between the holder and the base.

It is another object of the present invention to provide a storage container for a recording medium and methods for manufacturing and assembling same which lend themselves to fully automated assembly.

Finally, it is an object of the present invention to provide a method for assembling a storage container for a recording medium which utilizes a relatively simple, one-step assembly of the container's components.

To achieve the foregoing and other objects of the present invention and in accordance with the purposes of the invention, there is provided the following storage container for a recording medium, such as a compact, digital audio disc, and methods for manufacturing and assembling same.

The storage container includes: a base; a recording medium holder having means formed thereon for holding a recording medium and being pivotally attached at a first end thereof to a first end of the base and the other end being a free end for movement relative to the base; a cover also pivotally attached at a first end thereof to the first end of the base; and actuating means for moving the holder away from the base when the cover is lifted relative to the base, thereby automatically presenting the recording medium away from the base to facilitate removal. There is also provided a mechanism for clamping and unclamping the recording medium held on the holder as the holder is lifted away from the base during opening of the cover. This clamping mechanism includes a stationary half circle clamp formed on the holder and a half circle clamp formed on a tongue adapted for movement relative to the holder when the holder moves relative to the base.

The method of manufacturing the storage container described above includes at least the steps of: forming a base having holes at a first end thereof and ramps leading to the holes; forming a recording medium holder with projections at a first end thereof and having its other end free for movement relative to the base; forming a cover with projections at a first end thereof; forming actuating means associated with the first end of the cover and holder; and inserting the projections of the cover and the holder into the holes formed in the base via the ramps formed in the base.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

The preferred embodiment of the storage container according to the present invention will now be described with reference to FIGS. 1-5.

This storage container is indicated by reference numeral 10 and generally includes: a rectangular base 12; a recording medium holder 14; means 16 for holding a recording medium 18 thereon; a cover 20 pivotally attached to the base 12; and actuating means 22.

Figure 1:
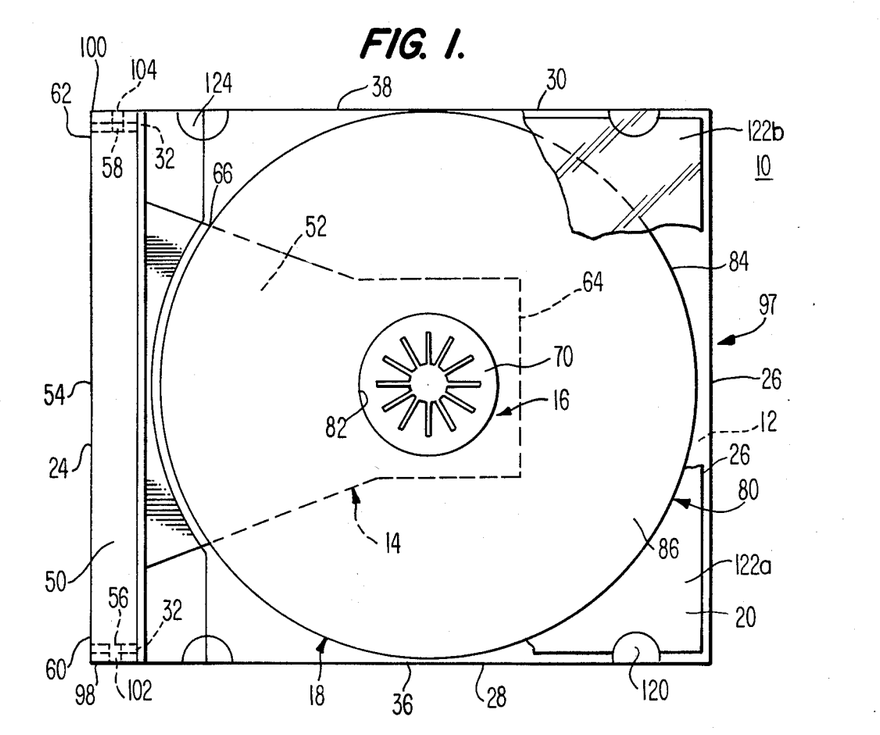
FIG. 1 is a top, plan view of the preferred embodiment of the storage container according to the present invention in the closed position.
Figure 2:
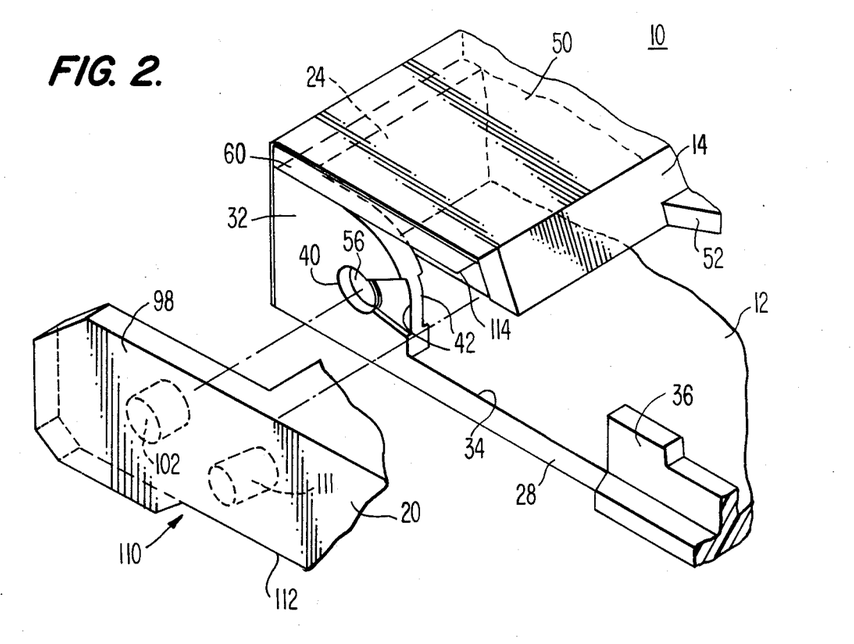
FIG. 2 is a cut away, exploded view of the rear of the storage container shown in FIG. 1.

The base 12 is substantially a rectangular plane, has a first end 24, a second, opposite end 26, a left side 28 and a right side 30. The base 12 is preferably made of a transparent, smokey-colored, impact resistant, polycarbonate. The base 12 also comprises side walls 36 and 38, each of which has a solid portion 32 extending from the first end 24 and a cut out portion 34 adjacent the solid portion 22. The cut out portion 34 allows for easy assembly of the cover 20 relative to the base 12 as described below. Each solid portion 32 includes a hole 40 formed therein and a ramp 42 formed in one or both side surfaces thereof, leading up to the hole 40.

The recording medium holder 14 is preferably made of dark, medium impact styrene and includes a first end 54 thereof, a first, elongated portion 50 which is attached to a second, triangular-like portion 52. The first portion 50 includes projections 56 and 58 formed on each end 60, 62 thereof, respectively, which are received by the holes 40 formed in the solid portions 32 of the base 12 to allow the holder 14 to pivot relative to the base 12. The ramps 42 provide a path for the projections 56 and 58 to follow when they are fit into the holes 40 to attach the holder 14 to the base 12. More particularly, the holder 14 is positioned on the base 12 by pushing the first portion 50 of the holder 14 having the projections 56, 58 formed thereon into the first end 24 of the base 12 along the ramps 42 so that the projections 56, 58 are guided into the holes 40.

Adjacent a second, free end 64 of the holder 14, there is formed the means 16 for holding the recording disc 18. In the preferred embodiment, this means 16 is a one-piece clamp 70 which is a circular, ribbed, projection formed integrally of the second portion 52. A recessed arc 66 is also formed in the second portion 52 of the holder 14 adjacent the first portion 50 to accommodate the recording medium 18.

The recording medium 18 in the preferred embodiment herein is a digital, audio, compact disc 80. Such discs 80 are flat, circular and include a circular central aperture 82, an edge 84 and a recording surface 86.

The clamp 70 receives by an interference fit the central aperture 82 of the disc 80, while the recessed arc 66 receives in spaced relation the edge 84 of the disc 80. As a result of the above-described structure, the disc 80, edge 84 and recording surface 86 are safely spaced from the storage container 10 to prevent damage of the disc 80 during shipment, storage, etc.

Figure 3:
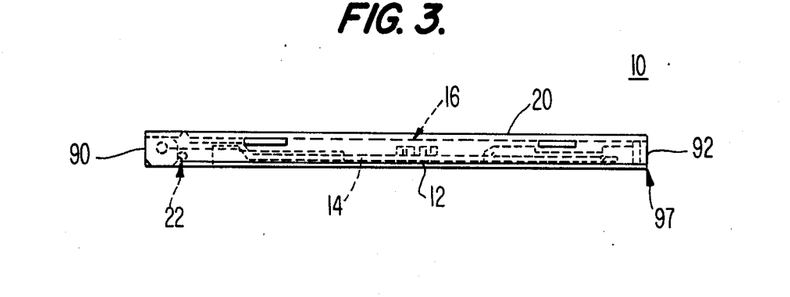
FIG. 3 is a side view of the storage container shown in FIG. 1 in the closed position.
Figure 4:
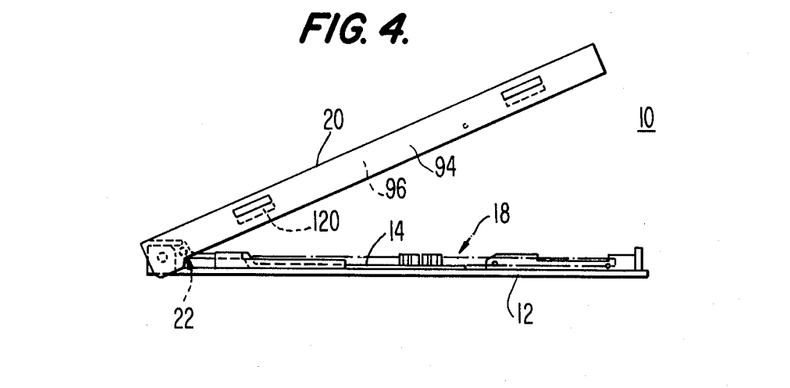
FIG. 4 is a side view of the storage container shown in FIG. 1 in the partially opened position.

The cover 20 is shaped to correspond substantially to that of the base 12 and is also made of a transparent, smokey-colored, impact resistant polycarbonate. The cover 20 includes a first end 90, a second end 92, a left side 94 and a right side 96, as shown in FIGS. 3 and 4. The cover 20 also includes two identical side walls 98 and 100, each of which has a pin 102, 104, respectively, extending inwardly therefrom adjacent the first end 90 of the cover 20. The pins 102, 104, are also adapted to fit into the corresponding holes 40 formed in the solid portions 32 of the base 12. Again, the ramps 42 provide a path for the pins 102, 104 to follow when fitting the pins 102, 104 into the holes 40 to attach the cover 20 to the base 12.

The materials of the cover 20, holder 14 and base 12 are specifically chosen for their toughness to resist breaking and cracking. These materials can be tinted, if desired, to provide a unique appearance, but still to allow viewing of the information containing inserts 122a, 122b described below and/or the disc 80.

The actuating means 22 in the preferred embodiment is a cam means 110 including a cam 111 formed on each side wall 98, 100 of the cover 20 near the inside bottom 112 thereof, and a cam follower 114 formed on each end 60, 62 of the first portion 50 of the holder 14 to cooperate with the cam 111 during opening of the storage container 10. That is, when the cover 20 is raised a certain degree relative to the base 12, as discussed below, the cams 111 abut the respective cam followers 114 and cause the holder 14 with the compact disc 80 mounted thereon to move upwardly away from the base 12.

As would be understood by one having ordinary skill in this art, the holder 14 can be lifted by any type of actuating means 22, such as linkages, cams, wires, springs, etc. that are capable of converting the movement of the cover 20 to a motion which lifts the holder 14 away from the base 12.

Figure 6:
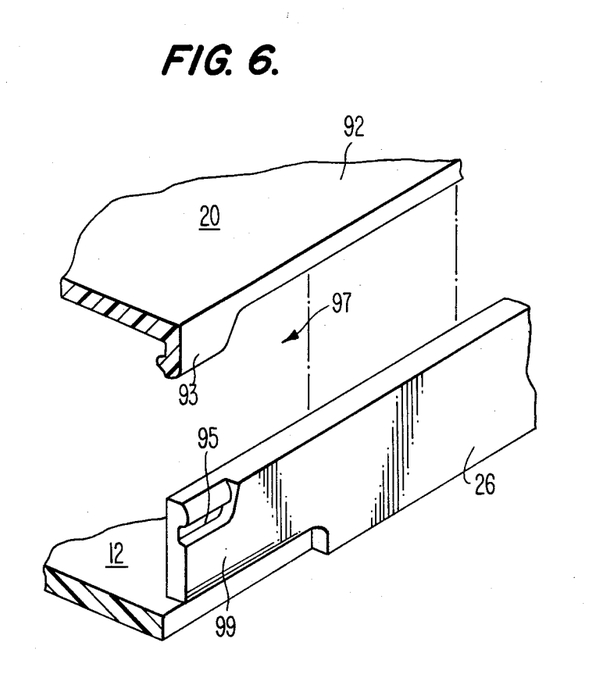
FIG. 6 is a cross-sectional, perspective view of the latch used in the present invention.
Figure 7:
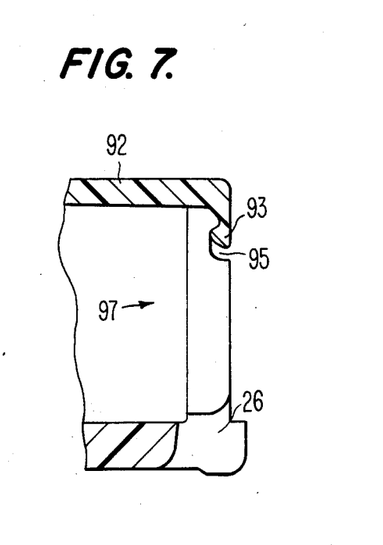
FIG. 7 is a side, cross-sectional view of the latch used in the present invention.
Figure 8:
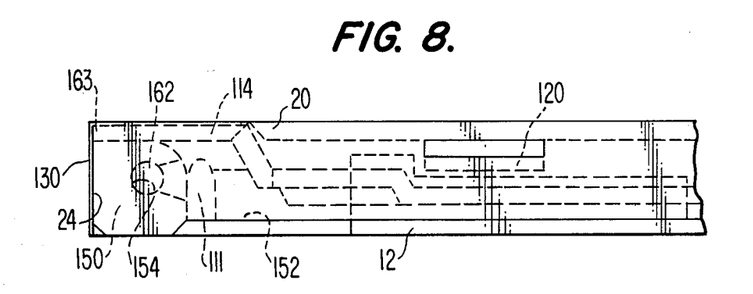
FIG. 8 is a side view of the rear of the storage container of a second embodiment according to the present invention in the closed position.
Figure 9:
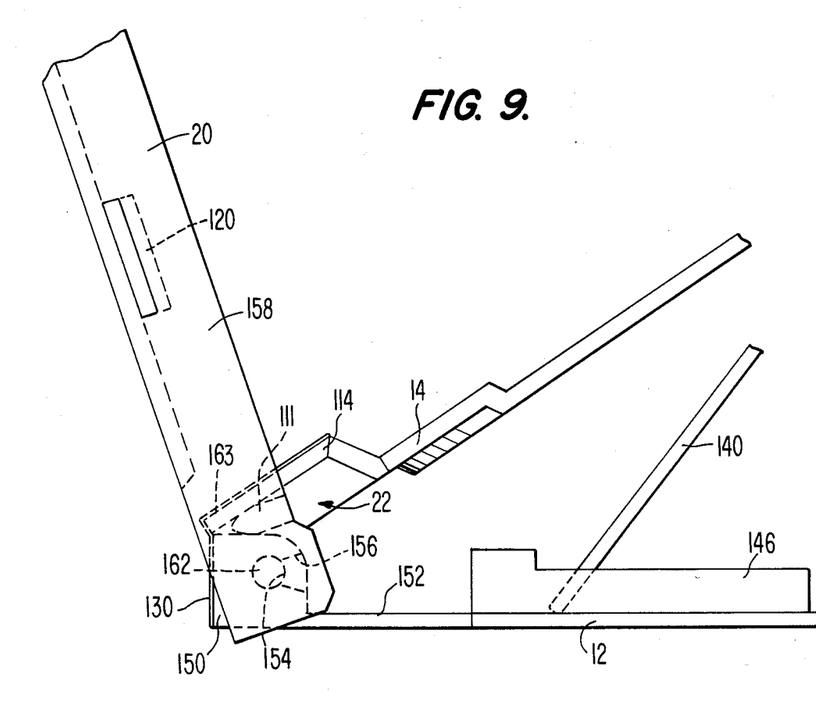
FIG. 9 is a cut away view of the rear of the storage container shown in FIG. 6 in the fully opened position.
Figure 10:
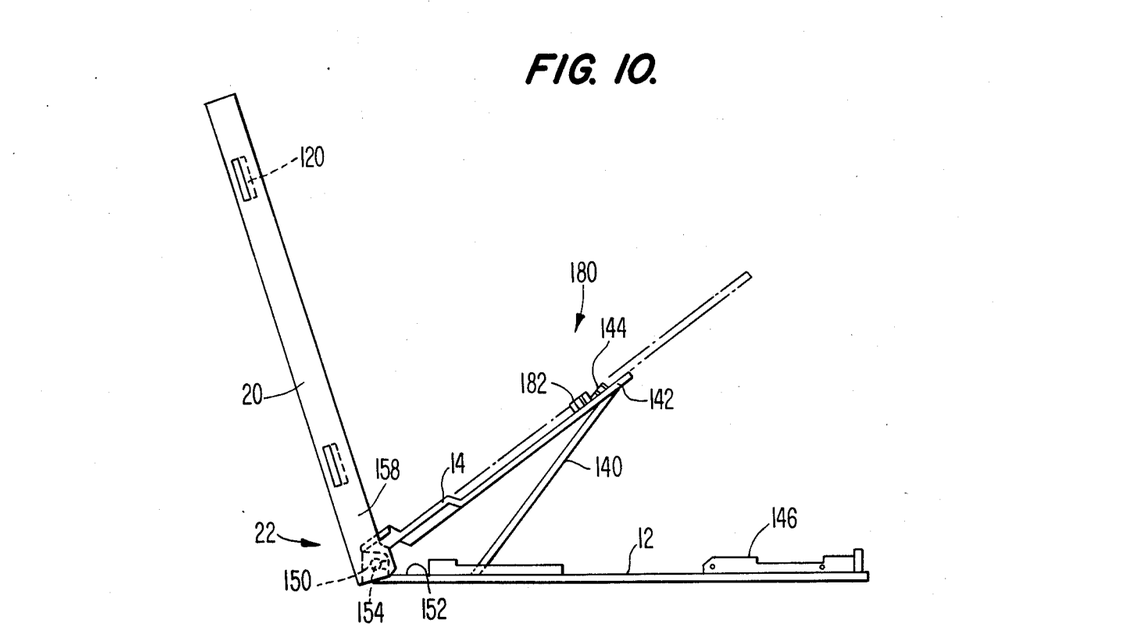
FIG. 10 is a side view of the storage container shown in FIG. 8 in the fully opened position.
Figure 11:
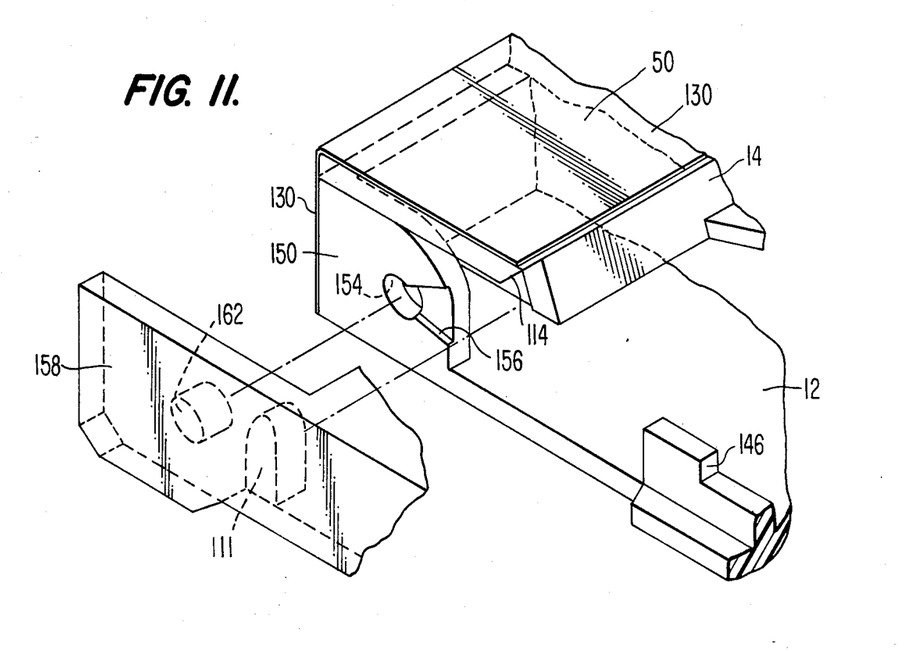
FIG. 11 is an exploded, cut away view of the rear of the storage container shown in FIG. 8.

As seen in FIGS. 6 and 7, a latch 97 is formed on the second ends 26 and 92 of the base 12 and cover 20, respectively. That is, a projection 93 is formed which cooperates with a pair of corresponding recesses 95 formed at the separated left and right front wall portions 99 and 101 (not shown) of the second end 26 of the base 12. Each of the front wall portions 99, 101 is capable of moving inwardly under pressure, such as a user's thumb pressure, to release the projection 93 from an interference fit with the recesses 95. The combination of the movable walls 99, 101, recesses 95 and the projection 93 create a positive opening and closing latch 97 for the container 10, which prevents breakage of the container 10, eliminates wear of the latch 97 and eliminates user frustration.

More particularly, the latch on a compact disc storage container must reliably hold the container closed, but must also be released relatively easily. A storage container tends to be opened like a book. Generally a thumb is pressed against the front wall of the storage container, and the cover is pulled away from the base. The conventional latch generally comprises, as stated above, a rib or projection which abuts a front wall of the base and eventually wears away. When the conventional container is manipulated during opening, the fingers may create pressure against the conventional latch, actually making it more difficult to release the latch.

In contrast, pressure does not "bind" or "jam" the latch 97 of the present invention but actually facilitates opening. That is, the latch 97 of the present invention employs a positive interference fit to hold the cover 20 and the base 12 securely together in the closed position. The latch 97 also unsnaps quite easily when one wishes to open it, does not inhibit viewing of the graphics at the front edge of the container and is strong enough to remain closed when being handled, but is forgiving if opened incorrectly, i.e., won't break.

Figure 5:
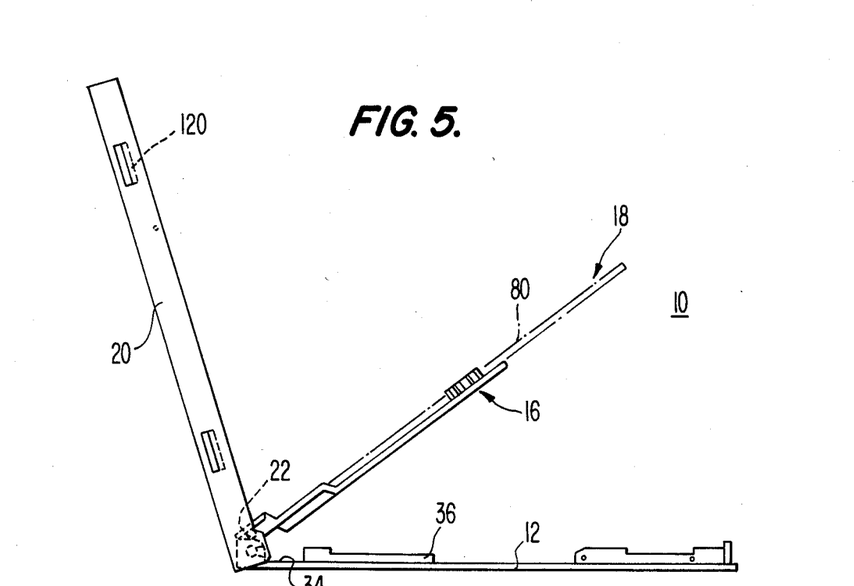
FIG. 5 is a side view of the storage container shown in FIG. 1 in the fully opened position.

As a result of the common pivoting structure and the actuating means 22 discussed above, the cover 20 and holder 14 are free to pivot relative to the base 12 between a first, closed position as shown particularly in FIG. 3, a partially open position as shown in FIG. 4, and a second, fully open position as shown in FIG. 5.

More particularly, in order to operate the preferred embodiment of the storage container 10, described above, the latch 97 is opened as described above and the cover 20 is pivoted relative to the base 12 by the user. As the cover 20 is raised, the cams 111 contact the cam followers 114 of the holder 14 to pivot the second, free end 64 thereof upwardly to present the recording medium 18 for use away from the base 12. The user then can easily place a thumb and middle finger on the opposite sides of the compact disc 18 and simultaneously push down with the index finger on the clamp 70, without interference from the base 12.

Preferably, a first information containing insert 122a, such as a printed sheet having song titles, advertising, etc., is trapped between the first portion 50 of the holder 14 and the first end 24 of the base 12. More particularly, during automated assembly and after the base 12, holder 14 and cover 20 are pivotally assembled, the cover 20 is pivoted relative to the base 12 about 90°, which raises the holder 14, as described above. When the holder is raised, the insert 122a can be positioned between the base 12 and holder 14. The holder 14 is then allowed to rest flat on the insert 122a.

The storage container 10 may also include a pair of spaced tabs 120 and 124 extending inwardly from each cover side wall 94 and 96, respectively, to support a second information containing insert 122b.

In a second embodiment shown in FIGS. 8-19, the holder 14 includes a tongue 140 pivotally attached at a first end 142 thereof to the second end 64 of the holder 14. The tongue 140 has a raised semicircular portion 144 adjacent its first end 142 which forms part of a two part clamp 180, the second part 182 being a raised semicircular portion integrally molded of the holder 14.

As with the preferred embodiment described above, the base 12 of this embodiment includes two identical side walls 146 and 148 (not shown) each of which has a solid portion 150 attached to the first end 24 of the base 12, and a cut out portion 152 adjacent the solid portion 150. Each solid portion 150 has a hole 154 formed therein with a ramp 156 formed in the outside surface thereof leading up to the hole 154. Two side walls 158 and 160 (not shown) are also formed in the cover 20, each of which has a pin 162, 164 (not shown) extending inwardly therefrom adapted to fit into a corresponding one of the holes 154 formed in the side walls 146 and 148 of the base 12. The ramps 156 provide a path for the pins 162 to follow when fitting them into the holes 154 to attach the cover 20 to the base 12. In contrast to the first embodiment described above, however, the first end 163 of the holder 14 is connected to the first end 24 of the base 12 by a living hinge 130.

As with the first embodiment described above, the actuating means 22 in this second embodiment is a cam means 110 including a cam 111 formed on each side wall 158, 160 of the cover 20, and a cam follower 114 formed on the holder 14 to cooperate with the cam 111 during opening of the storage container. That is, when the cover 20 is raised a certain degree relative to the base 12, the cams 111 abut the respective cam followers 114 and cause the holder 14 with the compact disc 80 mounted thereon to move upwardly away from the base 12.

The tongue 140 can take several different forms as described below.

Figure 12:
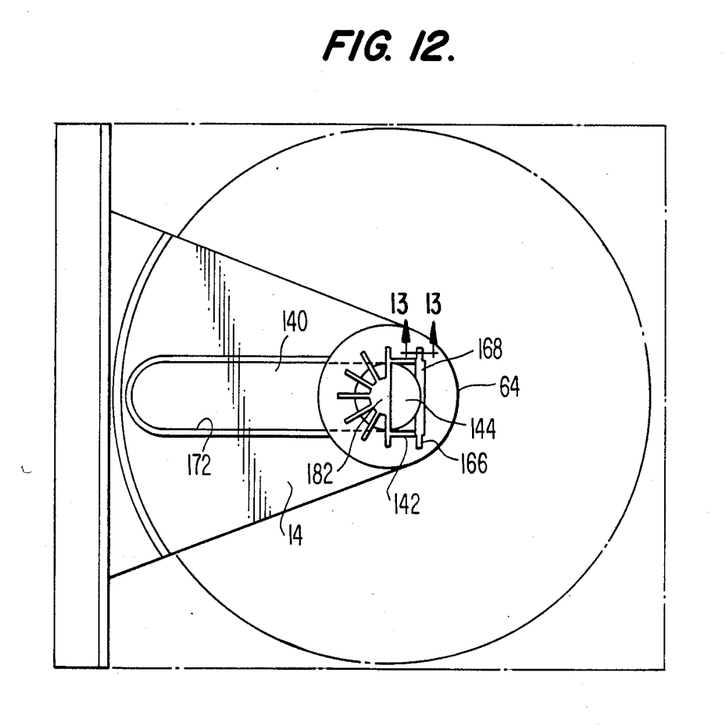
FIG. 12 is a top, plan view of one embodiment of the tongue member used with the storage container according to the present invention.
Figure 13:
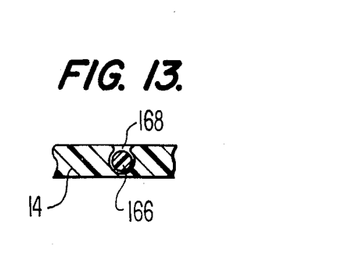
FIG. 13 is a cross sectional view taken along line 13—13 of FIG. 12.
Figures 14, 15, 16:
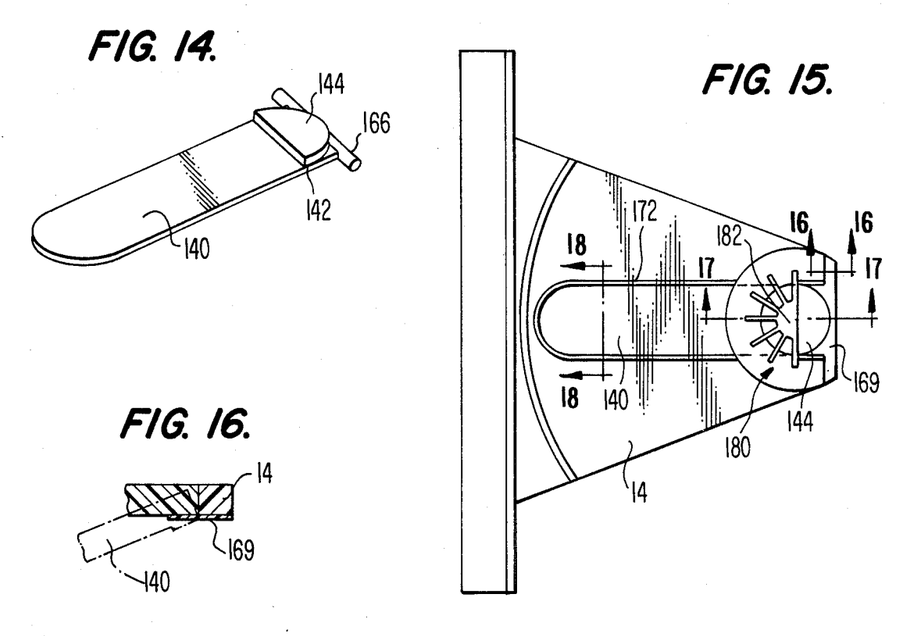
FIG. 14 is a perspective view of the tongue shown in FIG. 12.
FIG. 15 is a top, plan view of the recording medium holder according to the present invention incorporating another embodiment of the tongue member.
FIG. 16 is a side, cross-sectional view taken along line 16—16 of FIG. 15.

In one form the tongue 140 shown specifically in FIGS. 12-14, the tongue 140 is pivotally attached to the holder 14 by means of a rod 166 formed at the first end 142 thereof which fits into a groove 168 formed in the holder 14 adjacent the second end 64 thereof. The pivot point is below the raised portion 144 so that the raised portion 144 falls away as the tongue 140 pivots.

Figure 17:
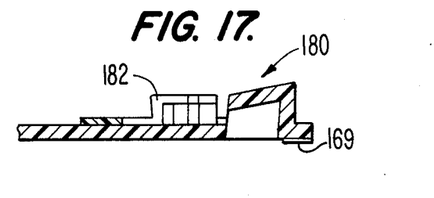
FIG. 17 is a side, cross-sectional view taken along line 17—17 of FIG. 15.

In another form shown in FIGS. 15-17, the tongue 140 is pivotally attached to the holder 14 by a living hinge 169 instead of the rod 166 and groove 168 combination shown in FIGS. 12-14.

Figure 18:
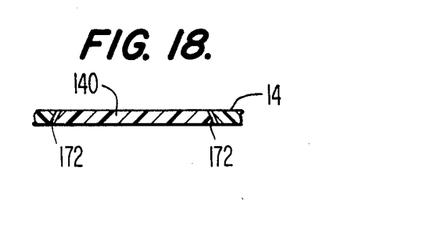
FIG. 18 is a side, cross-sectional view taken along line 18—18 of FIG. 15.
Figure 19:
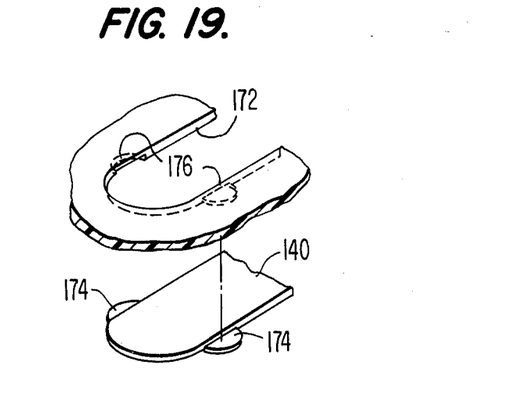
FIG. 19 is a cut away, exploded view of the tongue and corresponding slot according to still another embodiment of the present invention.
Figure 20:
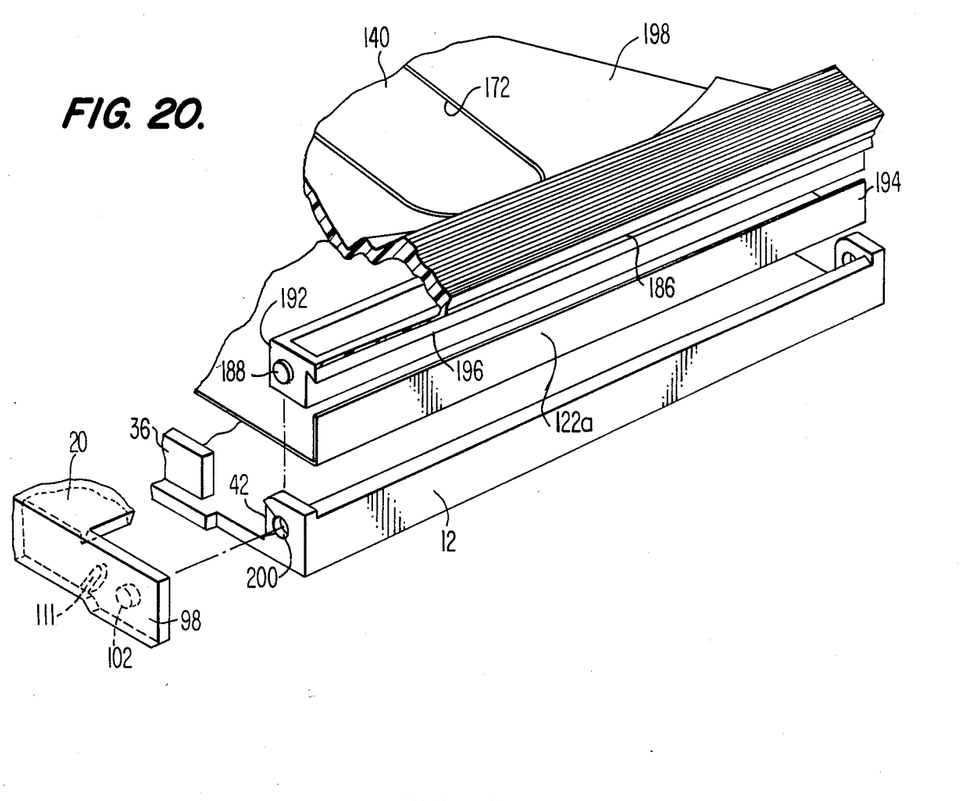
FIG. 20 is a rear, cut away, exploded view of another embodiment of storage container according to the present invention in the partially opened position.
Figure 21:
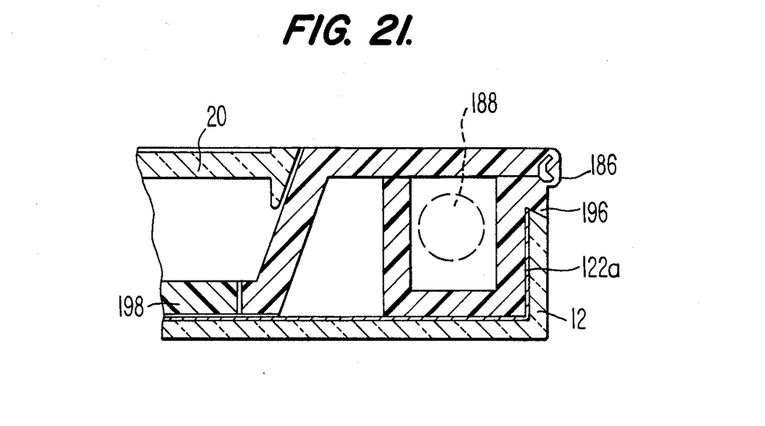
FIG. 21 is a side, cross-sectional view of the rear of the storage container shown in FIG. 20.
Figure 22:
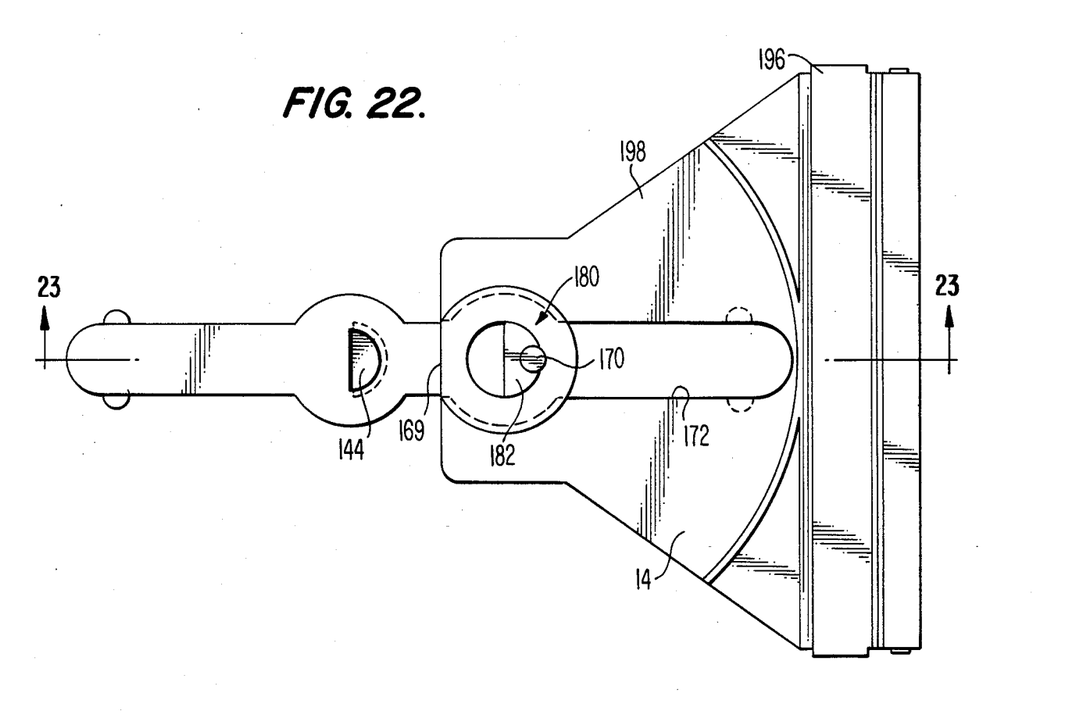
FIG. 22 is a top plan view of the recording medium holder shown in FIG. 20.
Figure 23:
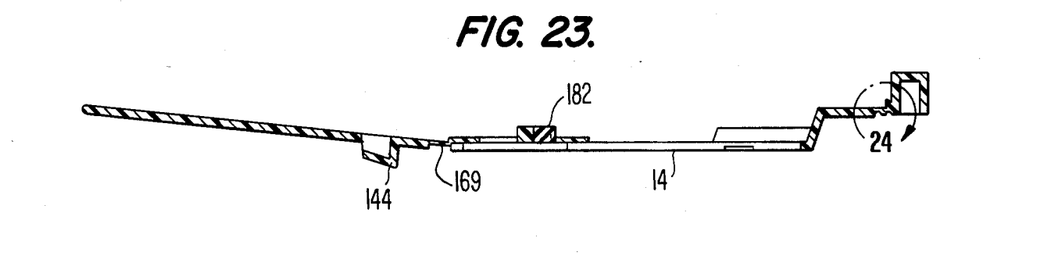
FIG. 23 is a side, cross-sectional view taken along line 23—23 in FIG. 22.
Figure 24:
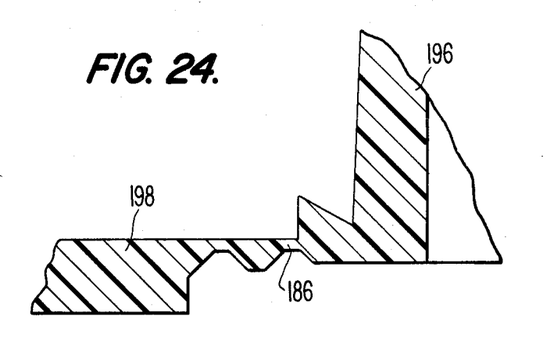
FIG. 24 is an enlarged area taken from FIG. 23.

As particularly shown in FIGS. 18 and 19, a slot 172 can also be formed in the holder 14 to accommodate the tongue 140 as shown in FIG. 19, in order to prevent the tongue 140 from pivoting upwardly through the slot 172, tabs 174 are formed to extend outwardly from each side of the tongue 140 and a recess 176 is formed on each side of the slot 172 on the bottom of the holder 14 to receive each tab 174. In an alternate version of the slot 172, each side of the tongue 140 is configured to slope downwardly and outwardly from the top thereof and each side of the tongue 140 also slopes downwardly and outwardly from the top thereof to permit the tongue 140 to be matingly received in the slot 172 without passing therethrough, as shown in FIG. 18.

In a third embodiment shown specifically in FIGS. 20-24, the holder 14 is entirely a one-piece construction. As such, the tongue 140 is connected to the holder 14 by a living hinge 169 and separate first and second portions 196 and 198 of the holder 14 are connected via a living hinge 186. Further, the second portion 198 of the holder 14 incorporates pins 188 and 190 (not shown) at the ends 192 and 194 thereof which are received by holes 200 formed in the base 12 as described above for the first embodiment. An information containing insert 122a can be easily captured between the second portion 198 of the holder 14 and the first end 24 of the base 12 during assembly of the holder.

The raised portion 144 of the tongue 140 may also include a compressible plug 170 mounted therein so as to extend outwardly from the periphery thereof. The plug 170 compressibly engages a portion of the compact disc central aperture 82 when the holder 14 is in the first, closed position.

As would be understood by one having ordinary skill in this art, the clamp 180 of this embodiment can be opened by any number of linkages, cams, wires, etc. that are capable of converting the movement of the cover 20 to a motion which opens the clamp 180. In addition, the clamp 180 can take several forms as long as it can prevent the disc 80 from moving in the storage container 10.

The operation of the embodiments described above employing a tongue 140 is as follows. When the holder 14 is in the first, closed position, the raised portion 144 of the tongue 140 and the second portion 182 of the clamp 180 are in engagement with the recording medium central aperture 82 to lock the recording medium 18 thereon. When the latch 97 is released as described above and the cover 20 is opened to about 45° relative to the base 12, the cams 111, of the cover 20 abut the cam followers 114 of the holder 14 and the holder 14 is pivoted relative to the base 12 to the second position, as described for the first embodiment. In addition, the tongue 140 pivots out of the slot 172 toward the base 12 under gravity, to move the raised portion 144 out of locking engagement with the aperture 82. The user can then easily remove the disc 80 from the container 10. The user may then replace the disc 80 by placing it on the second portion 182 of the clamp 180. The tongue 140 can then be moved back via a finger and, when the cover 20 is again closed, the tongue 140 moves again into the slot 172, such that the raised portion 144 again forms part of the clamp 180 to hold the compact disc 80 in place.

Figure 25:
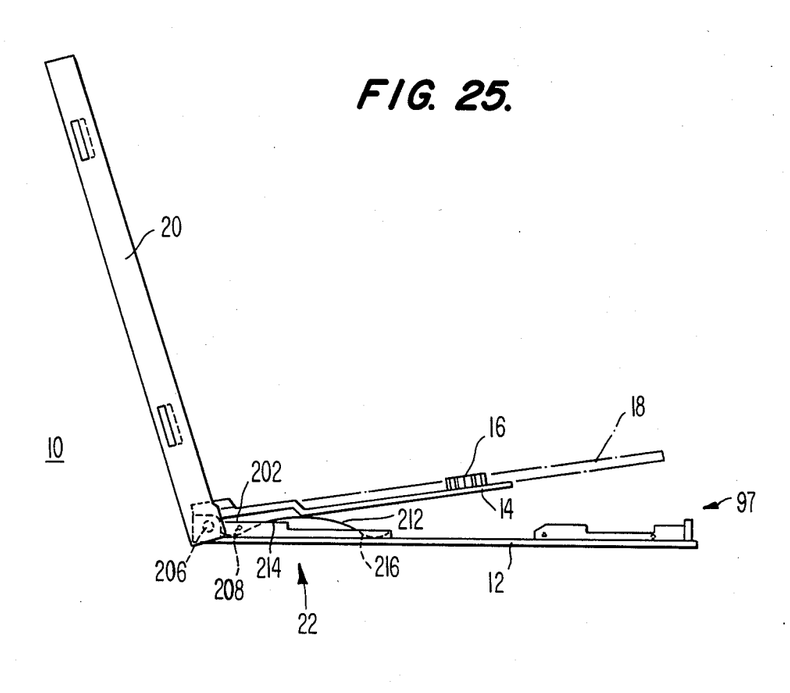
FIG. 25 is a side view of still another embodiment of the storage container according to the present invention.

FIG. 25 illustrates another embodiment according to the present invention. In this embodiment, the storage container 10' again includes: a rectangular base 12; a recording medium holder 14; means 16 for holding a recording medium 18 thereon; a cover 20 pivotally attached to the base 12; and actuating means 22.

The recording medium holder 14 includes projections 202, 204 (not shown) at the first end 206 thereof, which are received by holes 208 and 210 (not shown) formed in the base 12 to allow the holder 14 to pivot relative to the base 12.

The actuating means 22 in this embodiment includes an arched leaf spring 212, a first end 214 of which is fixedly attached near the first end 206 of the holder 14 and the second end 216 of which is a free end normally abutting the base 12.

As with the second embodiment described above, the cover 20 is pivotally connected to the base 12 via the same pin and hole combinations.

During operation, the cover 20 is opened relative to the base 12 by releasing the latch 97. As the cover 20 is raised, the leaf spring 212 biasing against the base 12 causes the holder 14 to piot upward via the projections 202, 204 since the holder 24 is no loner confined by the cover 20. Again, the disc 80 is automatically provided away from the base 12 to facilitate removal.

FIGS. 1-24 also illustrate the method according to the present invention. This method includes the following steps. First, a base 12 is formed as described above for the first embodiment. Then, the recording medium holder 14 is formed as described and pivotally attached at the first end 54 thereof to the first end 24 of the base 12 with an insert 122a therebetween. In addition the cover 20 is formed and pivotally attached at the first end thereof 90 to the first end 24 of the base 12. The pivotal attachment of the holder 14 and cover 20 relative to the ba se 12 can be performed by the following stages.

The holder 14 can be attached to the base 12 via the projections 56 and 58 formed on the holder 14 and the holes 40 formed in the base 12. Then the first end 90 of the cover 20 having the pins 102 and 104 formed therein is moved toward the first end 24 of the base 12. The pins 102, 104 are moved into the cut out portions 34 of the base 12 and enter the ramps 42 formed on the base 12. The ramps 42 direct the pins 56, 58, 102, 104 into the holes 40 to pivotally connect the holder 14 and the cover 20 to the base 12. At the same time, the pins 162, 164 are positioned below the walls 114 of the holder 14 which cooperate during operation with the pins 162, 164 to lift the holder 14 away from the base 12.

In the alternative, the storage container 10 can be assembled by pivotally attaching the holder 14 to the base 12 by means of a living hinge 130.

The foregoing is considered illustrative only of the principles of the invention. For example, although the above-description of the preferred embodiments relates particularly to application of the invention with compact audio discs, the present invention can also be applied a a storage container for other recording media, such as video discs, floppy discs, record albums and "45" records. Further, since numerous modifications and changes will readily occur to those skilled in the art, it is not desired to limit the invention to the exact construction and operation shown and described. For example, although the preferred embodiment described above is directed to a smokey-colored cover and base and an opaque holder, various smokey, clear and/or color combinations can be used. Accordingly, all suitable modifications may be resorted to, falling within the scope of the invention and the appended claims and their equivalents.

We claim:

1. A storage container for receiving a compact disc, comprising:
   (a) a base;
   (b) a recording medium holder having means for holding the compact disc at a center hole of the compact disc and being pivotally attached at a first end thereof to a first end of the base such that a second, free end thereof is adapted for movement between a first position and a second position;
   wherein the means for holding includes a pivotally mounted tongue having a portion which partially receives the center hole in the compact disc,
   (c) a cover movable relative to the base and holder and being pivotally attached at a first end thereof to the first end of the base; and
   (d) means for actuating movement of the holder relative to the base,
   whereby, when the cover is pivoted relative to the base, the actuating means causes the holder to move from the first position to the second position and to present the recording medium for use away fromt he base and the tongue pivots so that the portion thereof no longer partially receives the center hole of the compact disc.

2. The container as recited in claim 1, further comprising:
   (i) two side walls formed on the base, each of which has a hole formed therein;
   (ii) two side walls formed on the cover, each of which has a pin extending inwardly therefrom adapted to fit into a corresponding one of the holes formed in the side walls of the base, and
   (iii) two side walls formed on the holder, each of which has a pin extending inwardly therefrom adapted to fit into a corresponding one of the holes formed in the side walls of the base.

3. The container as recited in claim 2, further comprising:
   a ramp formed in each side wall of the base leading up to each hole,
   wherein each ramp provides a path for each pin to follow into each hole.

4. The container as recited in claim 1, further comprising:
   (i) two side walls formed on the base, each of which has a hole formed therein;
   (ii) a ramp formed in each side wall of the base leading up to the hole;
   (iii) two side walls formed on the cover, each of which has a pin extending inwardly therefrom adapted to fit into a corresponding one of the holes formed in the side walls of the base,
   wherein the ramps provide a path for the pins to follow into each hole; and
   (iv) a living hinge connected between the holder and the base.

5. The container as recited in claim 1, further comprising:
   (i) a first information containing insert; and
   (ii) a pair of spaced tabs extending inwardly from each side wall of the cover for supporting the first information containing insert.

6. The container as recited in claim 5, further comprising a second information containing insert located between the holder and the base.

7. The container as recited in claim 1, further comprising a latch formed on a front wall of the cover and a movable recess formed on a front wall of the base which cooperate via an interference fit to provide a positive opening and closing of the container.

8. A storage container for a recording medium, such as a compact disc or the like, comprising:
   (a) a base;
   (b) a recording medium holder including means for holding the recording medium thereon and being pivotally attached at a first end thereof to a first end of the base such that a second, free end thereof is adapted for movement between a first position and a second position;
   wherein the means for holding includes a clamp adapted for releasable engagement with an aperture formed in the recording medium, and
   wherein the holder includes a tongue pivotally mounted adjacent the second end thereof, the tongue having a raised portion adjacent the pivoted end which forms part of the clamp,
   (c) a cover pivotally attached at a first end thereof to the first end of the base; and
   (d) means for actuating movement of the holder relative to the base, whereby, when the cover is pivoted relative to the base, the actuating means causes the holder to move from the first position to the second position and to present the recording medium for use away from the base, and whereby, when the holder is in the first position, the raised portion is in engagement with the recording medium aperture to lock the recording medium thereon and, when the holder is moved to the second position, the tongue pivots away from the holder to move the raised portion out of locking engagement with the recording medium aperture.

9. The container as recited in claim 8, wherein the tongue is pivotally attached to the holder by a living hinge.

10. The container as recited in claim 8, wherein the tongue is pivotally attached to the holder by a rod formed on the tongue which fits into a groove formed in the holder.

11. The container as recited in claim 8, wherein the raised portion further includes a compressible plug extending outwardly thereof which engages a portion of the recording medium aperture, when the holder is in the first position.

12. The container as recited in claim 8, wherein the holder further comprises:
   (i) a slot to accommodate the tongue;
   (ii) at least one tab formed on the tongue; and
   (iii) at least one recess formed adjacent the slot to receive the at least one tab in order to prevent the tongue from passing through the slot.

13. The container as recited in claim 8, wherein the holder further comprises:
   a slot to accommodate the tongue, each side of the slot being configured to slope downwardly and outwardly from a top thereof and each side of the tongue also sloping downwardly and outwardly from a top thereof to permit the tongue to be matingly received in the slot without passing therethrough.

14. A method of manufacturing a storage container for a compact disc, comprising:
   (a) forming a base;
   (b) forming and pivotally attaching a recording medium holder at a first end thereof to a first end of the base and having a second end free for movement relative to the base between a first position and a second position, and including means for holding the compact disc at a center hole thereof;
      wherein the means for holding is formed to include a pivotally mounted tongue having a portion which partially receives the opening in the compact disc,
   (c) forming and pivotally attaching a cover, which is movable relative to the base and holder, at a first end thereof to the first end of the base; and
   (d) forming means for actuating movement of the holder relative to the base,
      whereby, when the cover is pivoted relative to the base, the actuating means causes the holder to move from the first position to the second position and to present the recording medium for use away from the base and to cause the tongue to pivot so that the portion thereof no longer partially receives the center hole of the compact disc.

15. The method as recited in claim 14, further comprising the substeps of:
   forming the base to include two side walls, each of which has a hole formed therein with a ramp formed in one side surface thereof leading up to the hole;
   forming the cover to include two side walls, each of which has a pin extending inwardly therefrom adapted to fit into a corresponding one of the holes formed in the side walls; and
   inserting the pins along the ramps and into the holes to pivotally attach the cover to the base.

16. The method as recited in claim 15, further comprising the step of:
   entrapping an information containing insert between the base and the holder.

17. The method as recited in claim 16, further comprising the step of:
   pivotally attaching the holder to the base by means of a living hinge.

* * * * *